United States Patent
Wagner et al.

[11] Patent Number: 6,053,209
[45] Date of Patent: Apr. 25, 2000

[54] PROCESS FOR MANUFACTURING RIBBED TUBES AND RIBBED TUBES THUS MANUFACTURED

[75] Inventors: Thomas Wagner, Menden; Frank Kramer, Holzwickede, both of Germany

[73] Assignee: KM Europa Metal AG, Osnabrück, Germany

[21] Appl. No.: 09/116,321

[22] Filed: Jul. 15, 1998

Related U.S. Application Data

[62] Division of application No. 08/892,408, Jul. 15, 1997, Pat. No. 5,809,647.

[30] Foreign Application Priority Data

Jul. 17, 1996 [DE] Germany .................. 196 28 745

[51] Int. Cl.[7] .................................................. F15D 1/00
[52] U.S. Cl. .......................... 138/38; 138/144; 138/142; 138/177; 138/178
[58] Field of Search ............................ 138/38, 142, 144, 138/177, 178; 29/890.03, 890.046, 890.047, 890.048; 219/121.63, 121.64, 121.72

[56] References Cited

U.S. PATENT DOCUMENTS

| | | | |
|---|---|---|---|
| 1,928,639 | 10/1933 | Berg | 138/38 |
| 3,773,241 | 11/1973 | Norris . | |
| 3,909,898 | 10/1975 | Hicks . | |
| 4,353,162 | 10/1982 | Van Meteren . | |
| 4,841,617 | 6/1989 | Schmidt et al. . | |
| 4,969,255 | 11/1990 | Schmidt et al. . | |
| 5,343,015 | 8/1994 | Ryan | 219/121.64 |
| 5,809,647 | 9/1998 | Wagner et al. | 29/890.048 |

FOREIGN PATENT DOCUMENTS 0 303 074   3/1994   European Pat. Off. .

*Primary Examiner*—James Hook
*Attorney, Agent, or Firm*—Kenyon & Kenyon

[57] ABSTRACT

The invention concerns a process for manufacturing ribbed tubes, wherein a stainless steel tube is provided with ribs by helicoidally winding a copper strip around it, and a ribbed tube thus manufactured. In joining the tube and rib, the unmelted copper strip is set on the tube surface edgewise into a melted area produced by a laser beam exclusively on the tube surface, thereby bonding the strip onto the tube by the solidification of the melted tube material. In this manner ribbed tubes can be provided, featuring an internal tube made of corrosion-resistant stainless steel and a helicoidal rib made of copper for increasing the heat exchange surface of the tube, which is distinguished by high thermal conductivity.

1 Claim, 1 Drawing Sheet

PROCESS FOR MANUFACTURING RIBBED TUBES AND RIBBED TUBES THUS MANUFACTURED

This application is a division of prior application Ser. No. 08/892,408, filed Jul. 15, 1997, now U.S. Pat. No. 5,809,647.

BACKGROUND OF THE INVENTION

The invention concerns a process for manufacturing ribbed tubes, wherein a stainless steel tube is provided with ribs by helicoidally winding a copper strip around it, and ribbed tubes thus manufactured.

European Patent 0 303 074 and U.S. Pat. Nos. 4,841,617 and 4,969,255 disclose a process for manufacturing metallic heat exchanger tubes having a heat exchange surface area increased by ribs. In that process, a strip forming the ribs is helicoidally wound around the outside surface of the rotating tube with the bottom edge of the strip being continuously welded to the tube.

In that process, welding is done by melting the contact surfaces of the tube and the bottom edge of the strip, the tube being melted with a laser beam exclusively on the tube surface and the strip being melted with the same laser beam exclusively in the area where the strip comes into contact with the tube, and by then joining the bottom edge of the strip being fed to the tube.

The tube and strip surface areas being melted and joined are brought tightly together by the attraction force exerted on the strip being fed as the strip comes into contact with the tube and are bonded together when they are subsequently cooled.

This process has been proven effective in industry. In particular, when different grades of stainless steel are used for the tube and ribs, this known process is well-suited and is often used for manufacturing ribbed tubes for a great variety of applications.

However, when a stainless steel tube and copper ribs are used for manufacturing ribbed tubes, this process has proven to be difficult to perform and can only be applied using complex equipment.

The main cause of the problem resides in the different material properties of stainless steel and copper, in particular the different melting points with a temperature difference of approximately 400° C. In this case there is a danger that the copper may sublimate before the stainless steel is melted.

This fact requires that the laser beam setting and control, as well as the rotation and winding speeds, be accurately adjusted. Corrective measures must also often be applied during the process for fine-tuning. Therefore the process, its control, and automation are complex.

Furthermore, the energy consumption of the laser, which must be focused on the surface of the tube and the bottom edge of the strip, is very high. Overall, the known process borders on the unfeasible when the materials stainless steel and copper are combined.

SUMMARY OF THE INVENTION

An object of this invention is to provide a process for the manufacture of ribbed tubes that is particularly well-suited for the material combination of stainless steel tubes and helicoidally wound ribs made of copper and that provides a high-quality bond between tube and rib. Furthermore, an object of the invention is a ribbed tube having a core of corrosion-resistant tube and a heat exchange surface increased through ribs having high thermal conductivity.

A process according to an embodiment of the invention provides for continuously melting the tube surface with a laser beam, exclusively in the contact zone where the tube is to be joined to the bottom edge of the strip, prior to setting the copper strip. This is done in an area that is greater in the axial direction of the tube than the width of the bottom edge of the strip. The length of the melted area in the peripheral direction of the tube depends on the specific dimensions of the tube, such as diameter and rib thickness, as well as on the material properties. The parallel rays of the laser beam can be focused on this area to form a hot spot, providing high power density, which is used in an optimized fashion for this purpose.

It is essential for the process according to this embodiment of the invention that the tube-side edge area of the copper strip be set unmelted into the melted tube material. The copper strip is reliably and tightly bonded to the tube through the subsequent solidification of the melted tube material.

Thus the invention provides a cost-effective process for bonding a helicoidal copper rib onto a stainless steel tube, avoiding the previous disadvantages. Despite the different material-specific properties of stainless steel and copper, ribbed tubes with the stainless steel/copper combination can be economically, manufactured.

The copper strip set on the tube edgewise may be tightly bonded to the tube at the bottom edge of the strip without the use of additional material. The heated zone is small and the structural changes in the tube and strip are slight.

The small dimensions of the heated zone, in conjunction with the reduced thickness of the seam, prevent the material from warping. This results in the ribbed tube having a high degree of shape and dimensional stability.

The laser beam can be accurately adjusted for and focused on its only job, which is to melt the tube surface in the contact zone. This provides short heating times and high joining speed.

A ribbed tube according to an embodiment of the invention is distinguished by the combination of a stainless steel tube and ribs made of copper.

Such a ribbed tube is used, for example, in areas where corrosive media flow through the tube, while on the outside there is a heat-exchange medium that is only slightly corrosive or non-corrosive.

By using stainless steel tubes, phase boundary surface reactions between the internal metallic tube surface and the liquid or gaseous heat exchange media are avoided. Damage, such as erosion or changes in the properties of the material, is thus prevented. On the other hand, the ribbed tube is distinguished by its copper rib and the advantages associated with it, such as high heat conductivity and resistance to air moisture, hot water, and different acids.

A ribbed tube according to an embodiment of the invention has excellent heat flow and therefore high efficiency. Accordingly, heat exchangers built with these ribbed tubes can be used more efficiently and can be designed to be more compact, which ultimately should result in lower heat exchange costs.

DETAILED DESCRIPTION OF THE DRAWINGS

Figure 1:
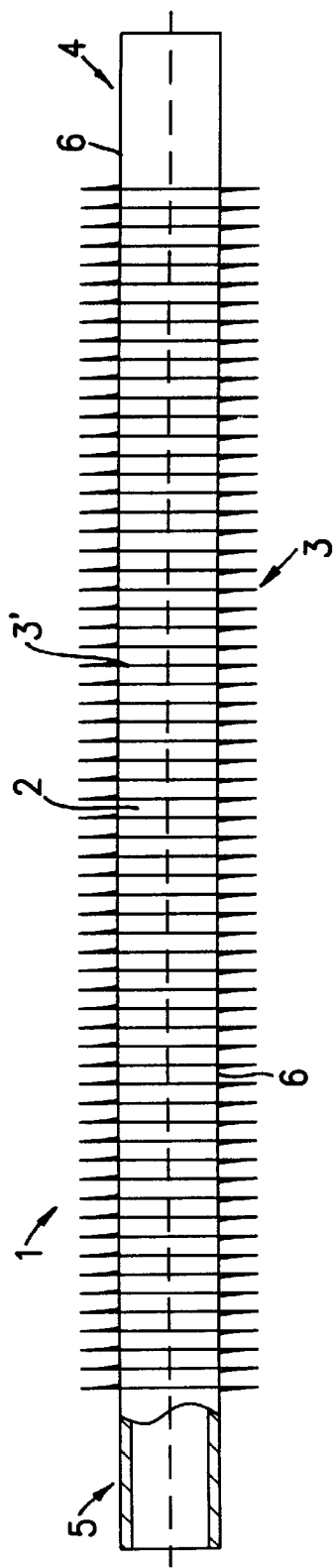
FIG. 1 shows a partially sectioned side view of an embodiment of a ribbed tube according to the invention.

FIG. 1 shows a ribbed tube 1, where a stainless steel tube 2 is provided with ribs using a helicoidally wound copper strip 3.

In the manufacturing process, the tube 2 to be provided with ribs is first fastened at its ends 4, 5 so that it can be driven in a rotating manner. Strip 3 to be wound on the tube 2 is drawn from a supply spool, aligned, and joined with tube 2 using a certain pulling and braking force. Strip 3 is continuously and progressively set on the tube surface 6 with a simultaneous rotation of tube 2 and an adjustable forward motion of strip 3 in the axial direction of tube 2. Strip 3 thug forms an endless rib 3' for increasing the heat exchange surface of tube 2.

Figure 3:
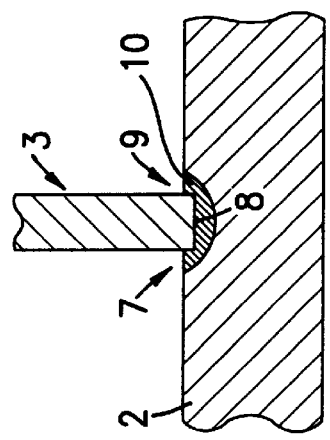
FIG. 3 shows a magnified view of the area identified as Section III in FIG. 2.
Figure 2:
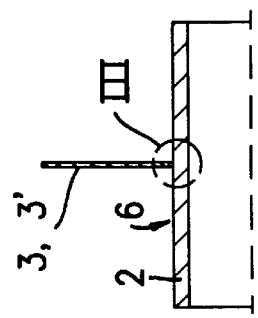
FIG. 2 shows a section through the ribbed tube shown in FIG. 1.

In joining the strip 3 to the tube 2, the strip 3 is set edgewise and unmelted on a melted area 10 on the tube surfaced 6, the melted area 10 being produced on tube surface 6 by a laser beam, and the strip 3 is bonded to the tube 2 through the solidification of the melted tube material (see FIGS. 2 and 3).

Welding is performed by melting only the tube surface 6 in a contact zone 7 of the tube 2, the contact zone 7 being the zone of the tube surface 6 with which the bottom edge 8 of the strip 3 will come in contact. Welding is done with a laser beam, prior to setting copper strip 3. The process is carried out continuously, with time and position adjusted to the helicoidal winding process. The width of the melted area 10 in the axial direction of the tube 2 is greater than the width of bottom edge 8 of the strip.

After the tube surface 6 has been melted in the contact zone 7, the tube-side edge area 9 of the cooper strip 3 is set unmelted into the melted area 10 of the tube surface 6. After the melted tube material has solidified, a reliable high-quality joint is produced due to the material bonding of the strip 3 to the tube 2.

As FIG. 3 shows, the tube-side edge area 9 is dipped into the melt when the copper strip 3 is set. Bottom edge 8 of the strip 3 thus extends slightly under the tube surface 6. After the melt has solidified, a tight joint of the copper strip 3 to the tube 2 is ensured, with good corrosion resistance at the boundary zone 10. The heated zone in this area is small, so that disadvantageous structural changes or material losses are prevented. At the same time, high rib efficiency and high heat transfer performance are ensured.

What is claimed is:

1. A ribbed tube comprising a stainless steel tube provided with ribs through helicoidally winding a copper strip around it, the ribbed tube being formed by a process wherein:

the copper strip is set unmelted edgewise into a melted area of the tube, the melted area being produced by a laser beam exclusively on a tube surface of the tube, and the copper strip is thereby bonded to the tube by solidification of the melted tube material.

* * * * *

UNITED STATES PATENT AND TRADEMARK OFFICE
CERTIFICATE OF CORRECTION

PATENT NO. : 6,053,209
DATED : April 25, 2000
INVENTOR(S) : Thomas Wagner, Frank Kramer It is certified that error appears in the above-identified patent and that said Letters Patent is hereby corrected as shown below:

Column 3, line 14, change "thug" to -- thus --.

Column 3, line 18, change "surfaced" to -- surface --.

Signed and Sealed this

Seventeenth Day of April, 2001

*Attest:*

NICHOLAS P. GODICI

*Attesting Officer*     Acting Director of the United States Patent and Trademark Office